US012683469B2

(12) United States Patent
Hirabayashi et al.

(10) Patent No.: US 12,683,469 B2
(45) Date of Patent: Jul. 14, 2026

(54) WIRING BOARD, ROTATING MACHINE, AND ROTATING DEVICE

(71) Applicant: MINEBEA MITSUMI Inc., Nagano (JP)

(72) Inventors: Koichiro Hirabayashi, Kitasaku-gun (JP); Seiya Fujimoto, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 245 days.

(21) Appl. No.: 17/997,672

(22) PCT Filed: Apr. 23, 2021

(86) PCT No.: PCT/JP2021/016489
§ 371 (c)(1),
(2) Date: Nov. 1, 2022

(87) PCT Pub. No.: WO2021/241096
PCT Pub. Date: Dec. 2, 2021

(65) Prior Publication Data
US 2023/0170769 A1 Jun. 1, 2023

(30) Foreign Application Priority Data

May 29, 2020 (JP) ................................. 2020-094252
May 29, 2020 (JP) ................................. 2020-094253

(51) Int. Cl.
*H02K 11/33* (2016.01)
*H02K 3/28* (2006.01)
*H02K 7/116* (2006.01)

(52) U.S. Cl.
CPC ............... *H02K 11/33* (2016.01); *H02K 3/28* (2013.01); *H02K 7/116* (2013.01); *H02K 2211/03* (2013.01)

(58) Field of Classification Search
CPC .......... H02K 11/33; H02K 3/28; H02K 7/116; H02K 2211/03; H02K 5/225; G03G 21/16;
(Continued)

(56) References Cited

U.S. PATENT DOCUMENTS 10,404,141 B2 9/2019 Yamasaki et al.
2009/0191730 A1* 7/2009 Ito .......................... H05K 1/116
439/83
(Continued)

FOREIGN PATENT DOCUMENTS

CN 105471152 A 4/2016
CN 111066232 A 4/2020
(Continued)

OTHER PUBLICATIONS

English translation of Written Opinion for corresponding International Application No. PCT/JP2021/016489 mailed Jul. 13, 2021.
(Continued)

*Primary Examiner* — Thomas Truong
(74) *Attorney, Agent, or Firm* — Chrisman Gallo Tochtrop LLC

(57) ABSTRACT

A wiring board includes a base including a hole part, an inner circumferential end part forming the hole part, and a wiring line including a part surrounding the hole part. The inner circumferential end part of the base is arranged at an inner side than the part surrounding the hole part. The inner circumferential end part of the base is deformed in a direction passing through the hole part.

7 Claims, 23 Drawing Sheets

(58) Field of Classification Search
CPC .......... H01R 12/77; H01R 13/42; H05K 1/02; H05K 1/11
See application file for complete search history.

(56) References Cited

U.S. PATENT DOCUMENTS

| | | | | |
|---|---|---|---|---|
| 2013/0049550 | A1* | 2/2013 | Watanabe | F04B 39/121 310/67 R |
| 2013/0072049 | A1 | 3/2013 | Sato et al. | |
| 2016/0036306 | A1* | 2/2016 | Yamasaki | H02K 5/225 310/71 |
| 2016/0094106 | A1 | 3/2016 | Yamasaki | |
| 2020/0266683 | A1 | 8/2020 | Hirabayashi | |

FOREIGN PATENT DOCUMENTS

| | | | |
|---|---|---|---|
| JP | 858-142958 | A | 8/1983 |
| JP | S58-142958 | U | 9/1983 |
| JP | 06-252525 | A | 9/1994 |
| JP | 2001-095200 | A | 4/2001 |
| JP | 2007-299610 | A | 11/2007 |
| JP | 2010-257833 | A | 11/2010 |
| JP | 2012-134215 | A | 7/2012 |
| JP | 2013-069486 | A | 4/2013 |
| JP | 2018-007553 | A | 1/2018 |
| JP | 2019-040936 | A | 3/2019 |

OTHER PUBLICATIONS

Notice of Reasons for Refusal dated Aug. 8, 2023 for corresponding Japanese Application No. 2022-527597 and English translation.
International Search Report for corresponding International Application No. PCT/JP2021/016489 mailed Jul. 13, 2021.
Written Opinion for corresponding International Application No. PCT/JP2021/016489 dated Jul. 13, 2021.
Chinese 202180027840.5 Office Action Issued on Jan. 26, 2025.

* cited by examiner

WIRING BOARD, ROTATING MACHINE, AND ROTATING DEVICE

CROSS-REFERENCE TO RELATED APPLICATIONS

This application is a national stage entry of International Application No. PCT/JP2021/016489 filed on Apr. 23, 2021, which claims the benefit of priority to Japanese Application Nos. JP2020-094252 and JP2020-094253, both filed May 29, 2020, the entire disclosures of which are hereby incorporated herein by reference.

TECHNICAL FIELD

The present invention relates to a wiring board, a rotating machine, and a rotating device.

BACKGROUND ART

Conventionally, there has been a rotating device (motor actuator) including a motor, an output gear, a sensor detecting a rotational position (rotation angle) of the output gear, and electronic components such as an integrated circuit (IC) for a local interconnect network (LIN) for controlling an operation of the motor. The rotating device can, for example, drive a plurality of switching doors (louvers) provided at the middle of an air passage of an air conditioning system for a vehicle such as a DC heating ventilation and air conditioning (HVAC).

CITATION LIST

Patent Literature

Patent Document 1: JP 06-252525 A
Patent Document 2: JP 2012-134215 A
Patent Document 3: JP S58-142958 U
Patent Document 4: JP 2007-299610 A

SUMMARY OF INVENTION

Technical Problem

In the above technique, for example, a technique is known to electrically connect the sensor and electronic components to connection terminals connected to external devices using a printed circuit board (PCB) or the like having a multi-layer power distribution configuration. In this case, for example, a columnar connection terminal is electrically connected to the PCB by being inserted into a hole part provided at a base film of the PCB and soldered.

However, when the columnar connection terminal is inserted into the hole part of the PCB and soldered, the solder may leak out of the hole part and flow between the columnar terminal and a housing of the rotating device. In this case, the columnar terminal comes off from the housing, making the fixation of the terminal to the housing unstable.

In one aspect, an object is to provide a wiring board, a rotating machine, and a rotating device capable of suppressing solder leakage from a hole part.

Solution to Problem

In one aspect, a wiring board includes a base including a hole part and an inner circumferential end part forming the hole part, and a wiring line including a part surrounding the hole part. The inner circumferential end part of the base is arranged at an inner side than the part surrounding the hole part. The inner circumferential end part of the base is deformed in a direction passing through the hole part.

According to the one aspect, solder leakage from the hole part can be suppressed.

DESCRIPTION OF EMBODIMENTS

Figure 1:
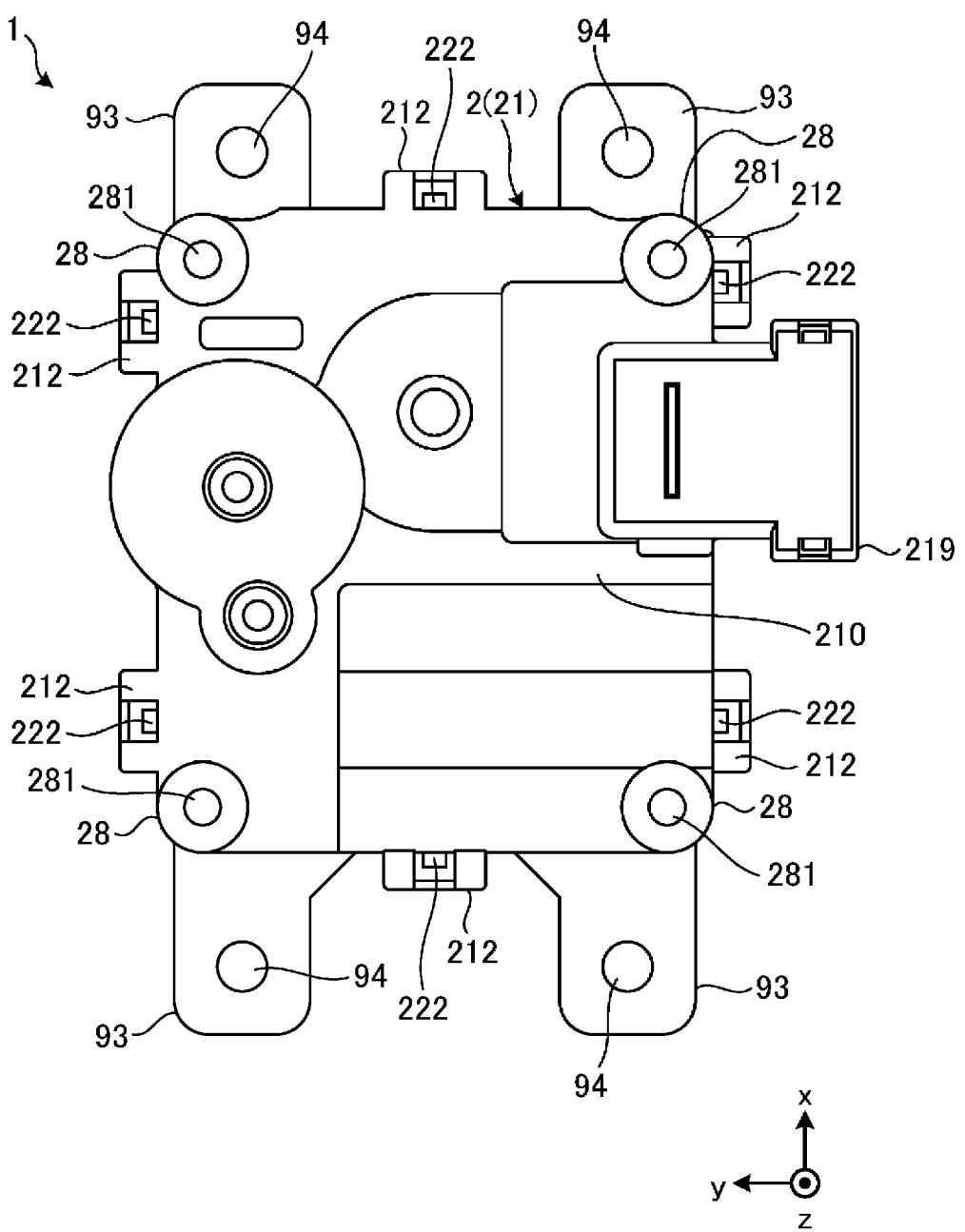
FIG. 1 is a plan view of a rotating device according to a first embodiment.

A wiring board, a rotating machine, and a rotating device disclosed in the present application will be described below with reference to the drawings. Note that in the drawings, the dimensional relationship of elements and the ratio of the elements may differ from reality. The dimensional relationship and the ratio may be different among the drawings. For the sake of clarity, a three-dimensional Cartesian coordinate system having an axis direction of an output shaft 51 described later as a Z-axis positive direction (rotation axis direction) may be illustrated in the drawings.

First Embodiment

Figure 2:
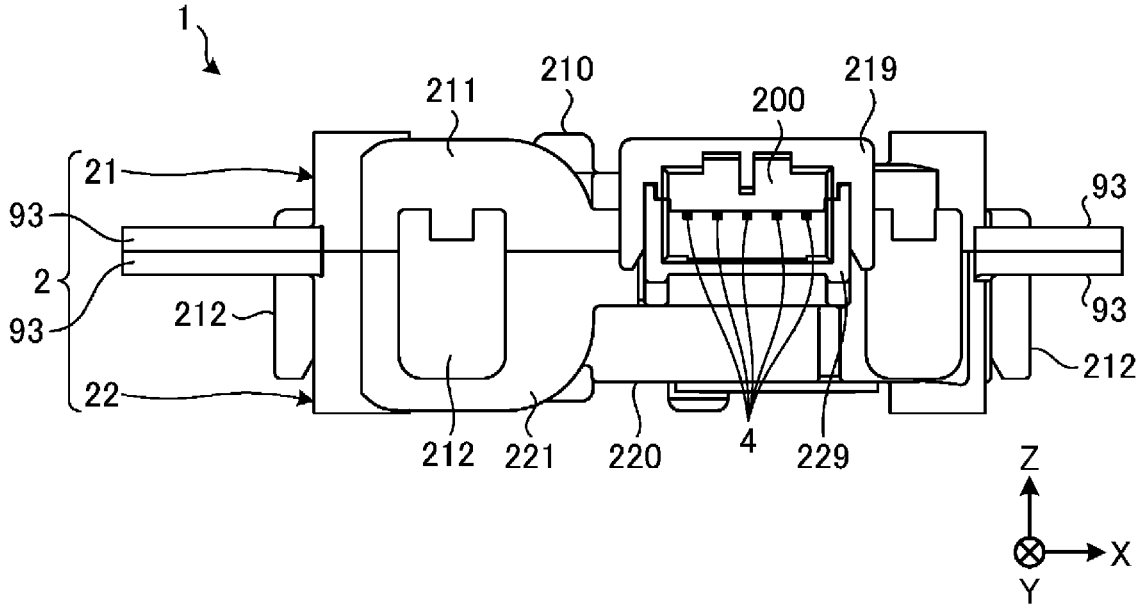
FIG. 2 is a side view of the rotating device according to the first embodiment.
Figure 3:
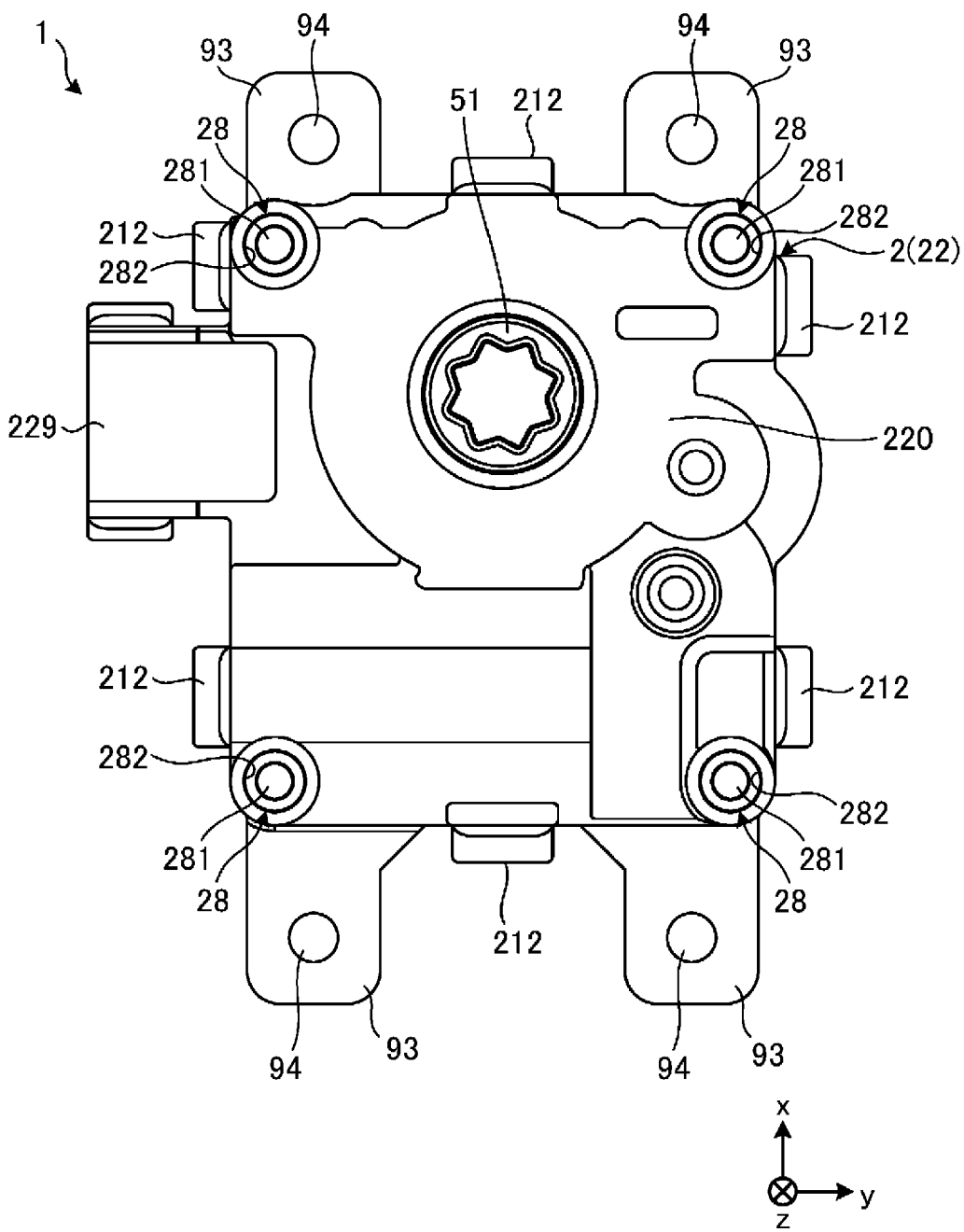
FIG. 3 is a bottom view of the rotating device according to the first embodiment.
Figure 4:
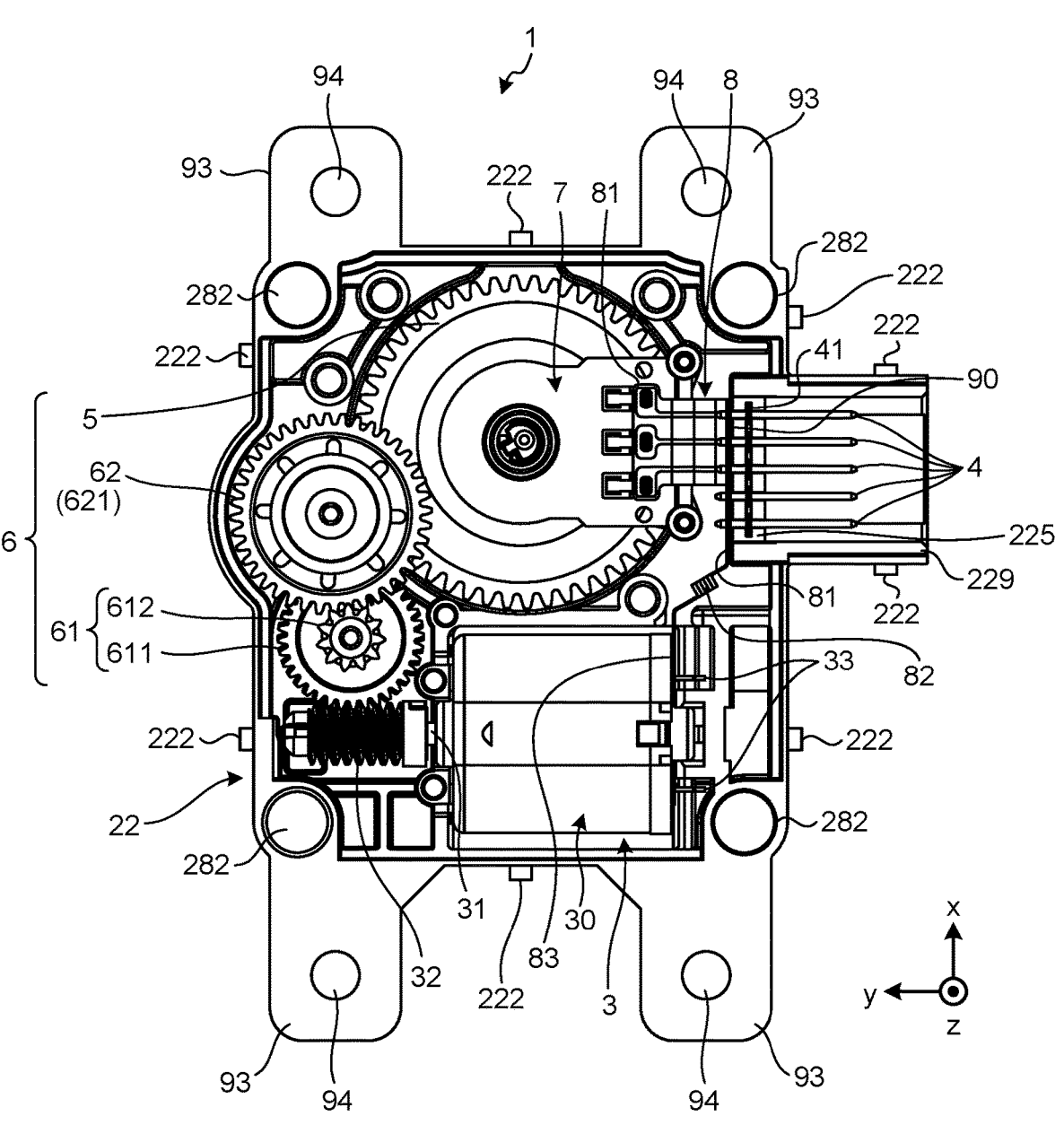
FIG. 4 is a plan view of the rotating device according to the first embodiment when a first housing is removed.
Figure 20:
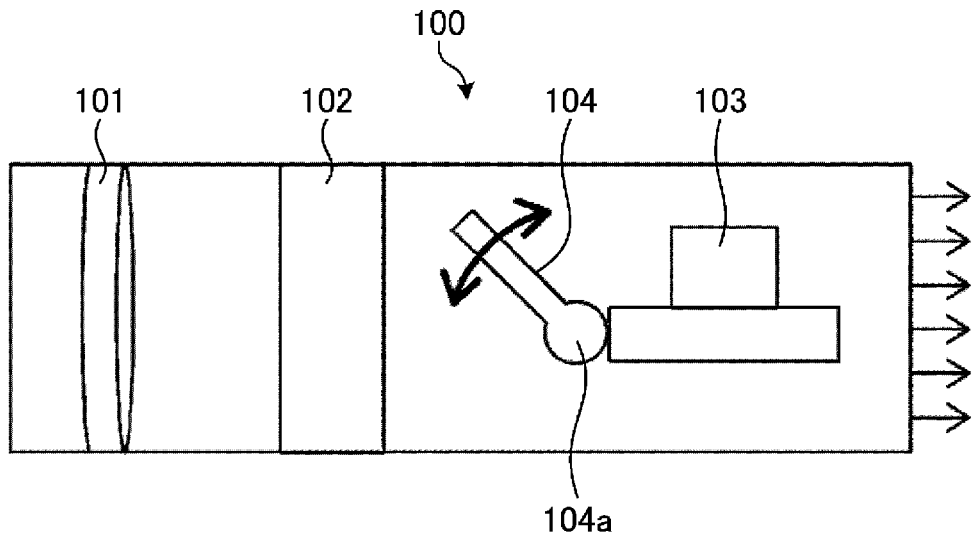
FIG. 20 is a schematic explanatory diagram illustrating an air conditioning system including a rotating device according to an embodiment.

FIG. 1 is a plan view of a rotating device according to a first embodiment, FIG. 2 is a side view of the rotating device according to the first embodiment, and FIG. 3 is a bottom view of the rotating device according to the first embodiment. FIG. 4 is a plan view of the rotating device according to the first embodiment when a first housing is removed. FIG. 20 is a schematic explanatory diagram illustrating an air conditioning system including a rotating device according to an embodiment.

A rotating device 1 according to the embodiment can be suitably used as, for example, an actuator used in an air conditioning system for a vehicle and can control the rotational operation of a louver for controlling wind volume or the like.

The rotating device 1 according to the embodiment is used, for example, in an air conditioning system 100 for a vehicle as illustrated in FIG. 20 and can control the rotational operation of a louver 104 for controlling wind volume or the like. The air conditioning system 100 for the vehicle includes a blower fan 101, an evaporator 102 for cooling air fed from the blower fan 101, and a heater 103 disposed downstream of the evaporator 102. The louver 104 controlling a supply amount of air flowing from the evaporator 102 side to the heater 103 side is disposed between the evaporator 102 and the heater 103, and a drive shaft 104*a* of the louver 104 is rotated by the rotating device 1.

As illustrated in FIGS. 1 to 4, the rotating device 1 includes a housing 2 accommodating a power transmission mechanism inside. Here, specifically, the power transmission mechanism includes a motor 3, a plurality of gears (hereinafter referred to as a gear group) 6 for transmitting power from the motor 3, and a sensor 7 for detecting a rotation angle of an output gear 5 included in the gear group 6, illustrated in FIG. 4. Note that the sensor 7 may detect the number of rotations rather than the rotation angle of the output gear 5 or may detect both the rotation angle and the number of rotations.

The gear group 6 of the power transmission mechanism includes a worm gear 32 mounted at a rotation shaft 31 of the motor 3, a first transmission gear 61, a second transmission gear 62, and the output gear 5. In other words, as illustrated in FIG. 4, rotation of the worm gear 32 is transmitted to a helical gear 611 of the first transmission gear 61 and also transmitted to a helical gear 621 of the second transmission gear 62 via a small diameter gear 612 provided coaxially with the helical gear 611 and having a relatively smaller diameter than the helical gear 611. Rotation of the second transmission gear 62 is then transmitted to the output gear 5 via, for example, a small diameter gear (not illustrated) provided coaxially with the helical gear 621 and having a relatively smaller diameter than the helical gear 621. The output shaft 51 (FIG. 3) is connected to the output gear 5. For example, an external shaft such as the drive shaft 104*a* of the louver 104 of the air conditioning system 100 described above is engaged with the output gear 5. Accordingly, the rotational operation of the louver 104 can be controlled by rotating the output gear 5, and thus the wind volume or the like of the air conditioning system 100 can be adjusted (see FIG. 20).

As described above, the rotation of the motor 3 is decelerated at a predetermined deceleration rate and output from the output shaft 51 to the outside. Then, the rotation angle of the output gear 5 is detected by the sensor 7. Information of the rotation angle of the output gear 5 detected by the sensor 7 is transmitted to the outside via five connection terminals 4 illustrated in FIGS. 2 and 4. When each of the plurality of connection terminals 4 are represented in a distinguished manner, each of the plurality of connection terminals 4 may be referred to as connection terminals 4*a* to 4 *e*. The connection terminal 4 is an example of a columnar conductive member.

Note that as the sensor 7 according to the present embodiment, for example, a rotary resistive position sensor can be used to detect a change in resistance caused by displacement of a contact position of a brush with respect to a conductive part in the circumferential direction, with a sensor board and the conductive brush. However, the configuration of the sensor 7 is not necessarily limited to the configuration of the present embodiment. In the present embodiment, a DC motor is employed as the motor 3, but a brushless motor or a stepping motor may be employed. In a case where a brushless motor or a stepping motor is employed, the rotating device 1 may not require the sensor 7.

As illustrated in FIGS. 1 to 3, the housing 2 includes a first housing 21 and a second housing 22 opposing each other. In other words, the housing 2 is formed by connecting the first housing 21 (FIG. 1) and the second housing 22 (FIG. 3). Note that, when describing the vertical positional relationship, a state where the first housing 21 of the rotating device 1 is positioned relatively at an upper side (Z-axis positive direction side) and the second housing 22 is positioned relatively at a lower side (Z-axis negative direction side) is used as a reference.

As illustrated in FIGS. 1 and 2, the first housing 21 includes a first surface part 210 serving as a top surface part of the housing 2, and a first side wall part 211 provided at an outer peripheral part of the first surface part 210. On the other hand, as illustrated in FIGS. 2 and 3, the second housing 22 includes a second surface part 220 serving as a bottom surface part of the housing 2 and a second side wall part 221 provided at an outer peripheral part of the second surface part 220. Note that the housing 2 is formed of a resin material such as polypropylene, polyethylene terephthalate, or ABS.

As illustrated in FIGS. 1 and 2, in the first housing 21, a plurality of engagement parts 212 extending toward the second housing 22 side are integrally formed at an outer peripheral part of the first side wall part 211. On the other hand, as illustrated in FIGS. 1 and 4, in the second housing 22, a plurality of projections (hereinafter, referred to as "engagement projections") 222 corresponding respectively to the plurality of engagement parts 212 of the first housing 21 are integrally formed at the second side wall part 221. The plurality of engagement projections 222 are engaged with the plurality of engagement parts 212.

As described above, the housing 2 is formed by abutting the first housing 21 and the second housing 22 against each other (see FIG. 2). In other words, by engaging the engagement projections 222 of the second housing 22 with the engagement parts 212 of the first housing 21, the first housing 21 and the second housing 22 are integrated, and the housing 2 accommodating the power transmission mechanism including the motor 3, the gear group 6, and the like described above is formed.

Note that, in the present embodiment, although the engagement parts 212 are provided at the first housing 21 and the engagement projections 222 are provided at the second housing 22, the engagement parts 212 may be provided at the second housing 22 and the engagement projections 222 may be provided at the first housing 21.

In addition, as illustrated in FIGS. 1 to 3, tabs 93 (hereinafter, referred to as attachment tabs) each protruding outward are formed at both end parts of one sides of the first housing 21 and the second housing 22. The attachment tabs 93 are provided with coupling holes 94, and fasteners (not illustrated) as predetermined fixing members are inserted through the coupling holes 94. The joined first housing 21 and the second housing 22 are securely coupled together with the predetermined fasteners through four coupling holes 94 to form the integrated housing 2.

In the configuration of the housing 2 described above, in the present embodiment, the projected parts 28 are provided at corner parts of the first side wall part 211 forming the outer peripheral part of the first housing 21, and second through-holes 282 are provided at corner parts of the second housing 22. In other words, in the first housing 21, the cylindrical projected parts 28 including first through-holes 281 are formed to protrude from the first surface part 210. Fasteners (not illustrated) such as bolts or screws can be inserted through the first through-holes 281. The second housing 22 is provided with the second through-holes 282, and the projected parts 28 are fitted into the second through-holes 282.

A plurality of projected parts 28 are provided, and a plurality of second through-holes 282 are also provided accordingly. The plurality of projected parts 28 are provided at a plurality (four) of corner parts of the first housing 21, respectively, and the plurality of second through-holes 282 are also provided at a plurality (four) of corner parts of the second housing 22, respectively. In the present embodiment, the first surface part 210 of the first housing 21 and the second surface part 220 of the second housing 22 have a substantially rectangular shape in plan view, and the projected parts 28 and the second through-holes 282 are provided at the four corner parts, respectively.

As illustrated in FIG. 3, in the second housing 22, the second through-holes 282 are formed at portions corresponding to the four corner parts of the second side wall part 221. The attachment tabs 93 are provided at the outside of the four corner parts of the second side wall part 221.

As illustrated in FIGS. 1 to 3, projected parts 219 and 229 corresponding to each other are formed at the first housing 21 and the second housing 22, respectively. In the present embodiment, the projected parts 219 and 229 protrude in an extending direction of the connection terminals 4. The projected parts 219 and 229 are bonded together to form a connector part 200 (FIG. 2). As illustrated in FIG. 2, the plurality of (five, for example) connection terminals 4 are held at the connector part 200. Note that the projected part 229 is an example of a part of the housing.

As illustrated in FIG. 4, the connection terminals 4 are, for example, columnar conductive members provided with flanges 41. The plurality of connection terminals 4 are disposed, for example, at the projected part 229 of the second housing 22. At this time, as will be described later, the connection terminals 4 are disposed such that, for example, the flanges 41 fit into a groove part 228 formed at a holding part 225 provided at the projected part 229 of the second housing 22. As will be described later, the connection terminals 4 are pressed by first projection parts 216a to 216e and second projection parts 217a to 217e formed at the pressing part 215 provided at the projected part 219 of the first housing 21.

Further, as illustrated in FIG. 4, the rotating device 1 according to the present embodiment includes a flexible wiring board 8 serving as a substrate for electrically connecting the connection terminals 4 to the motor 3 and the sensor 7. Via the wiring board 8 and the connection terminals 4, an input/output signal for driving the motor 3 is obtained from the outside and a signal corresponding to the rotation angle of the output gear 5 from the sensor 7 is output to the outside. Here, the wording "electrically connecting" means a concept including a case of directly connecting two members and a case of connecting two members via another member.

The wiring board 8 is, for example, a so-called FPC (Flexible Printed Circuit) formed of a flexible film. Generally, an FPC is composed of a base film (base), a wiring line, and a coverlay. In the following, the description will be given assuming that the coverlay is not illustrated.

The flexible wiring board 8 has a structure, and in the structure, an adhesive layer is formed at a base film (resin substrate) having a thickness of, for example, from approximately 12 μm to approximately 50 μm, and a conductor having a thickness of, for example, from approximately 12 μm to approximately 50 μm is printed or bonded on the adhesive layer. The base film is formed of, for example, an insulating resin material such as polyimide or polyester. The conductor is formed of a metal material such as copper. Note that the adhesive layer is formed of an epoxy-based resin or an acrylic resin. The wiring board 8 is a flexible board, and the flexible board can be bent and be restored to a shape before bending even when bent at an angle of 90 degrees or more. Note that the conductor is an example of a wiring line.

The wiring board 8 includes three major planar parts 81, 82, and 83, as illustrated in FIG. 4. Specifically, provided are the first planar part 81 connected to the connection terminals 4 and the sensor 7, the third planar part 83 at the side connected to terminals 33 of the motor 3, and the second planar part 82 connecting the first planar part 81 and the third planar part 83.

Figure 5:
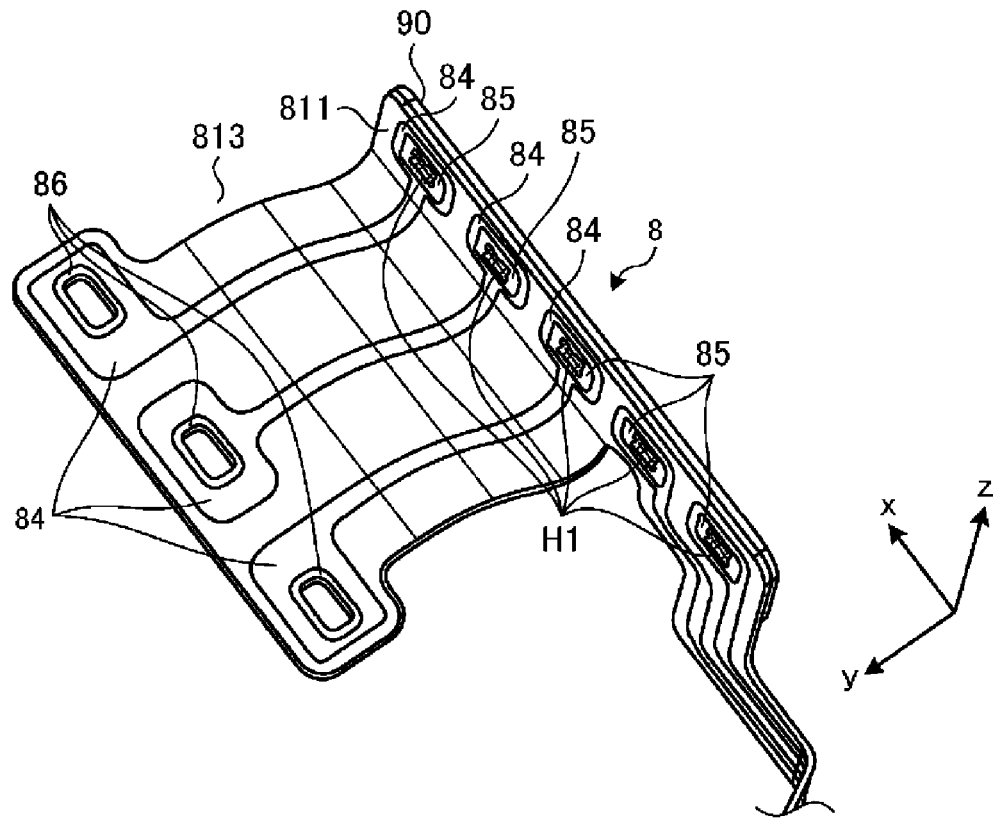
FIG. 5 is a perspective view of a wiring board according to the first embodiment.
Figure 6:
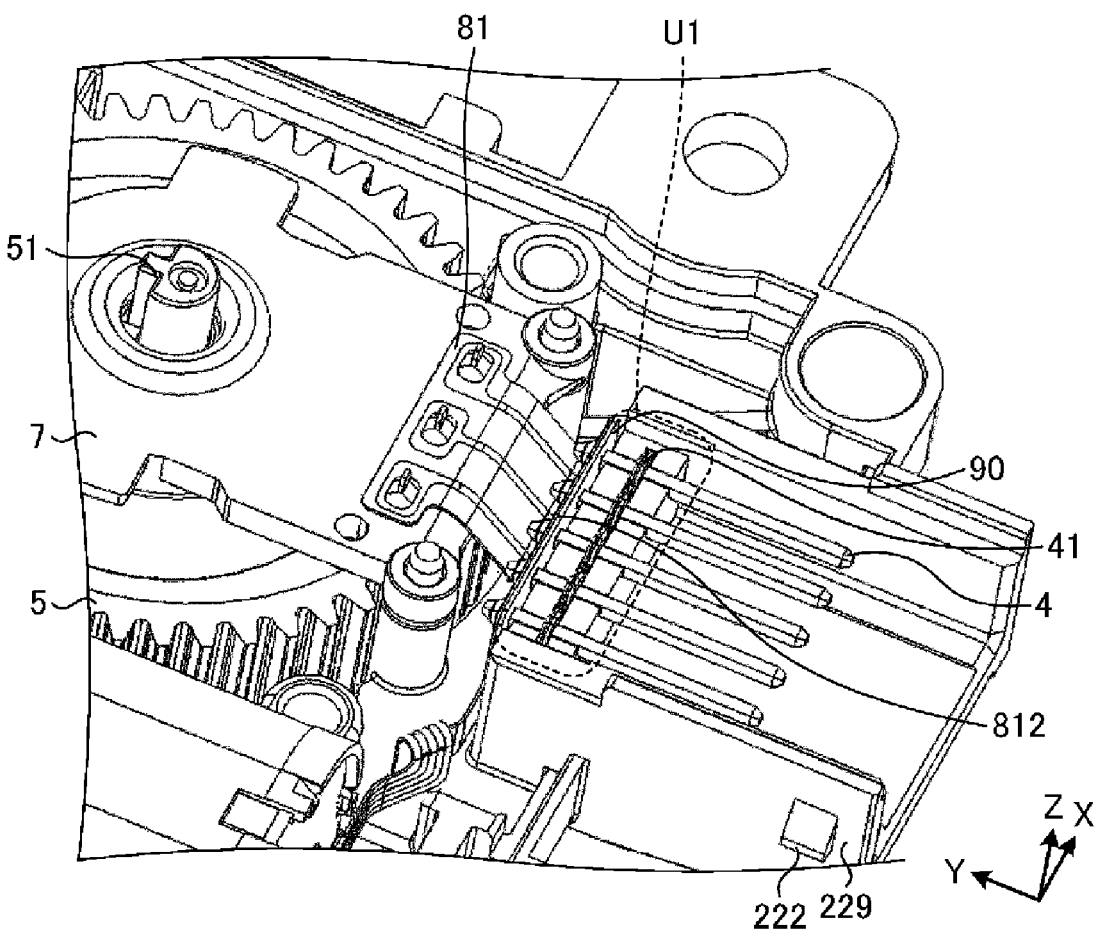
FIG. 6 is a perspective view of the wiring board mounted at the rotating device according to the first embodiment.
Figure 7:
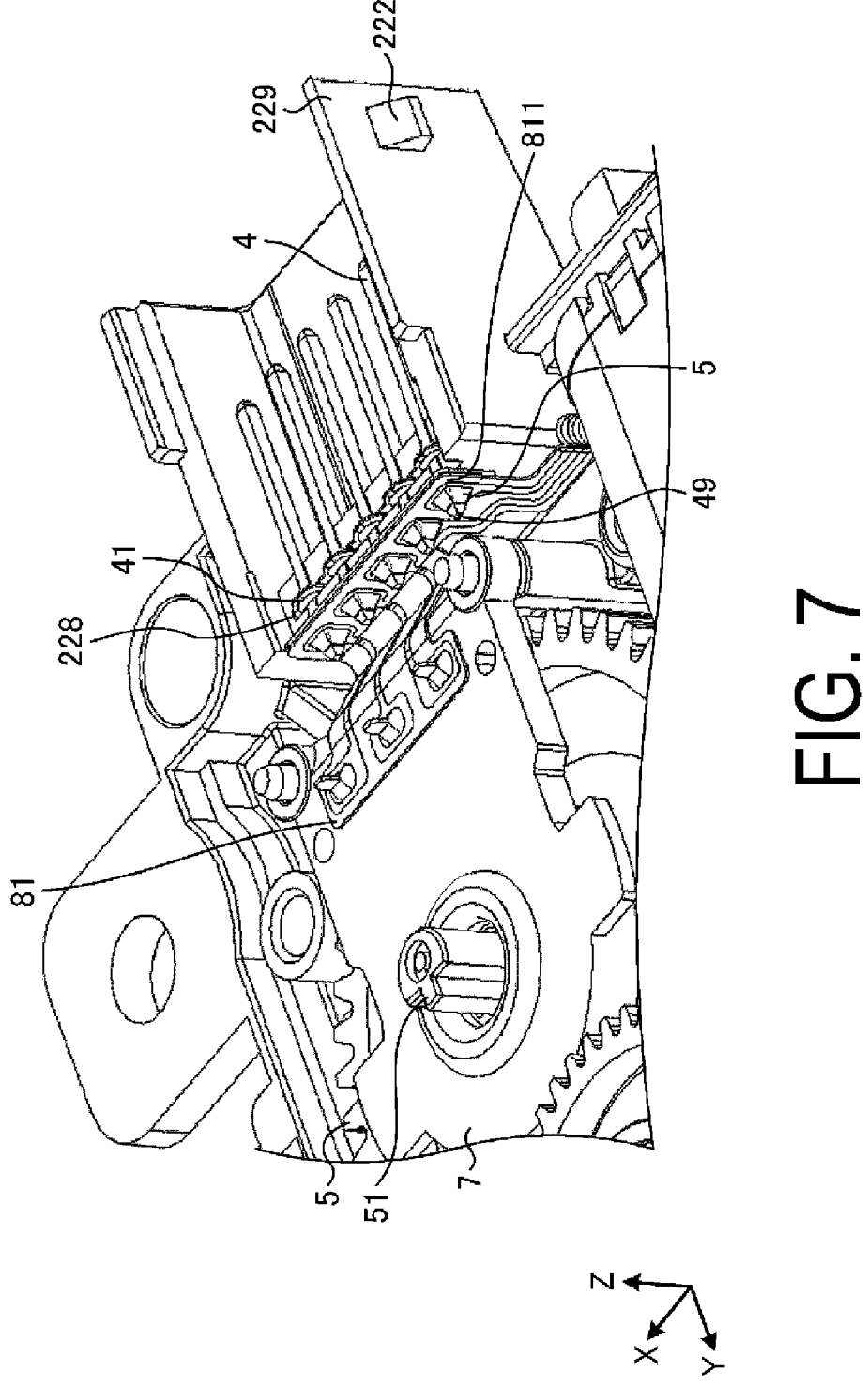
FIG. 7 is a perspective view of the wiring board mounted at the rotating device according to the first embodiment.
Figure 8:
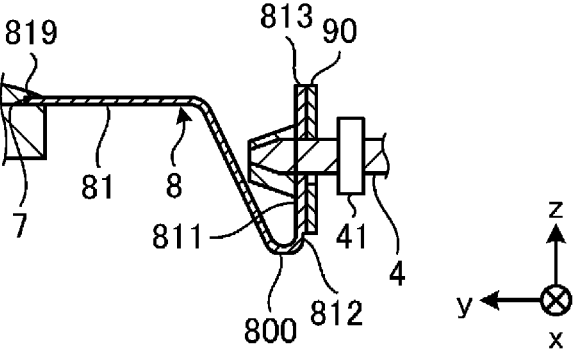
FIG. 8 is a cross-sectional view of the wiring board mounted at the rotating device according to the first embodiment.

FIG. 5 is a perspective view of a wiring board according to the first embodiment. FIGS. 6 and 7 are perspective views of the wiring board mounted at the rotating device according to the first embodiment. FIG. 8 is a cross-sectional view of the wiring board mounted at the rotating device according to the first embodiment. Note that in FIG. 5, the second planar part 82 and the third planar part 83 are not illustrated.

The first planar part 81 includes a base 813 and wiring lines 84. The wiring lines 84 are formed at a first surface 811 side of the first planar part 81. Note that as illustrated in FIGS. 5 and 8, a reinforcing member 90 such as a support plate may be provided as a member different from the wiring board 8 at a second surface 812 side of the first planar part 81 of the wiring board 8. Note that the reinforcing member 90 is an example of a member different from the wiring board.

A plurality of hole parts H1 are formed at the base 813. One ends 49 of the connection terminals 4 are inserted through the plurality of hole parts H1. By inserting the connection terminals 4 through these hole parts H1 to perform soldering, a secure electrical connection can be achieved. That is, the connection terminals 4 are electrically connected to the wiring board 8 by solder S. The hole parts H1 of the wiring board 8 are formed by inner circumferential end parts 81a to 81e, respectively, serving as parts of the base 813 and will be described later. Note that the solder S is an example of a conductive member provided at the first surface.

As illustrated in FIGS. 6 and 7, the wiring board 8 is disposed such that the first planar part 81 is located between the sensor 7 and the connection terminals 4, for example. As illustrated in FIG. 8, in the first planar part 81, a bent part 800 is formed between one end part having the hole parts H1 connected to the connection terminals 4, and another end part 819 connected to the sensor 7.

For example, each of the connection terminals 4 is inserted through each of the hole parts H1 of the wiring board 8 at a Y-axis positive direction side. The plurality of connection terminals 4 are lined, for example, in a direction intersecting the insertion direction (orthogonal direction (X-axis direction) in the embodiment). As described above, the connection terminals 4 inserted through the hole parts H1 are, for example, soldered to the wiring board 8 and fixed to the wiring board 8 by the solder S. The hole parts H1 are formed, for example, in the same number as the number of connection terminals 4.

In the first planar part 81 of the wiring board 8, the first surface 811 and the second surface 812 are, for example, in a front-to-back relationship in the direction where the connection terminals 4 pass (Y-axis positive direction), and the second surface 812 is a surface at the opposite side of the first surface 811. The second surface 812 side of the first planar part 81 of the wiring board 8 opposes a part of the housing 2. In the present embodiment, the second surface 812 side opposes the projected part 229 being a part of the housing 2, via the reinforcing member 90.

The wiring lines 84 are formed at the first surface 811 side of the wiring board 8, as described above. The wiring lines 84 have five first lands 85a to 85e being parts electrically connected to the connection terminals 4. In the following, when the plurality of first lands 85a to 85e are represented without distinction, the first lands 85a to 85e may be referred to as first lands 85. The first land 85 is formed at a part surrounding each of the hole parts H1. A size of the connection terminal 4 is, for example, larger than the hole part H1, and is smaller than a size of the part surrounded by the first land 85. Note that the first land 85 is an example of a conductive member.

The wiring lines 84 extend to the other end part 819 of the first planar part 81, for example, via the bent part 800. The wiring lines 84 formed at the other end part 819 have second lands 86 being parts electrically connected to the sensor 7. The second lands 86 are connected to, for example, terminals provided at the sensor 7 by the solder S. In other words, the terminals of the sensor 7 are electrically connected to the wiring board 8 by being soldered to the second lands 86 provided at the other end part 819 of the first planar part 81.

Further, the wiring lines 84 extend to the third planar part 83 via the second planar part 82 of the wiring board 8. The wiring lines 84 formed at the third planar part 83 have third lands (not illustrated) being parts electrically connected to the terminals 33 of the motor 3.

Figure 9:
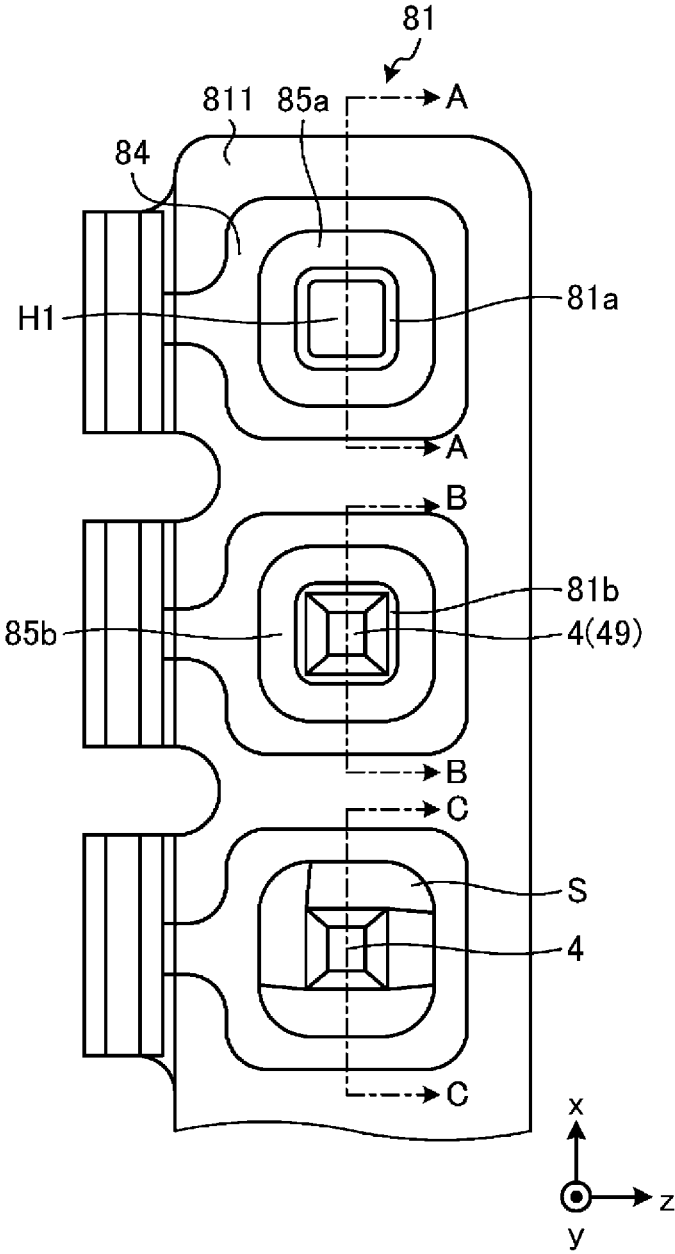
FIG. 9 is a plan view of a first planar part of the wiring board according to the first embodiment.
Figure 10A:
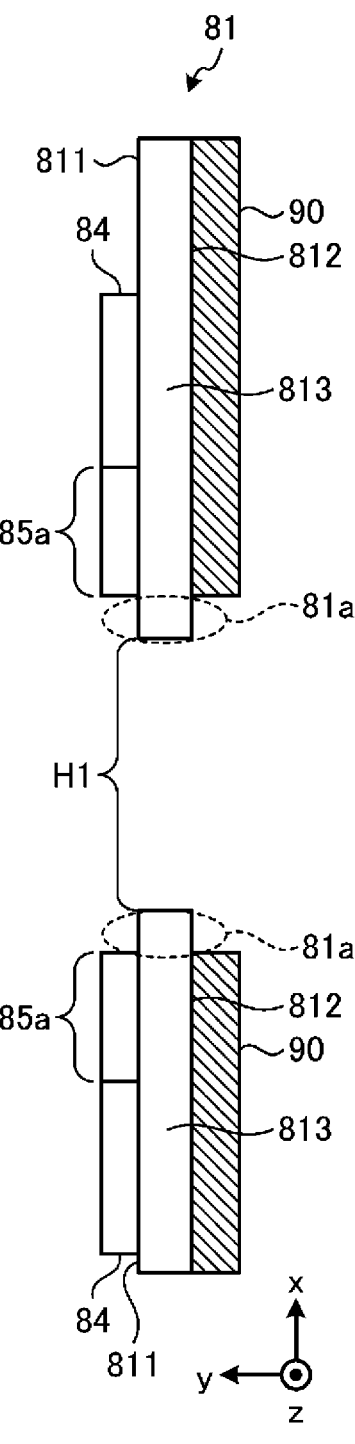
FIG. 10A is a cross-sectional view taken along a line A-A in FIG. 9.
Figure 10B:
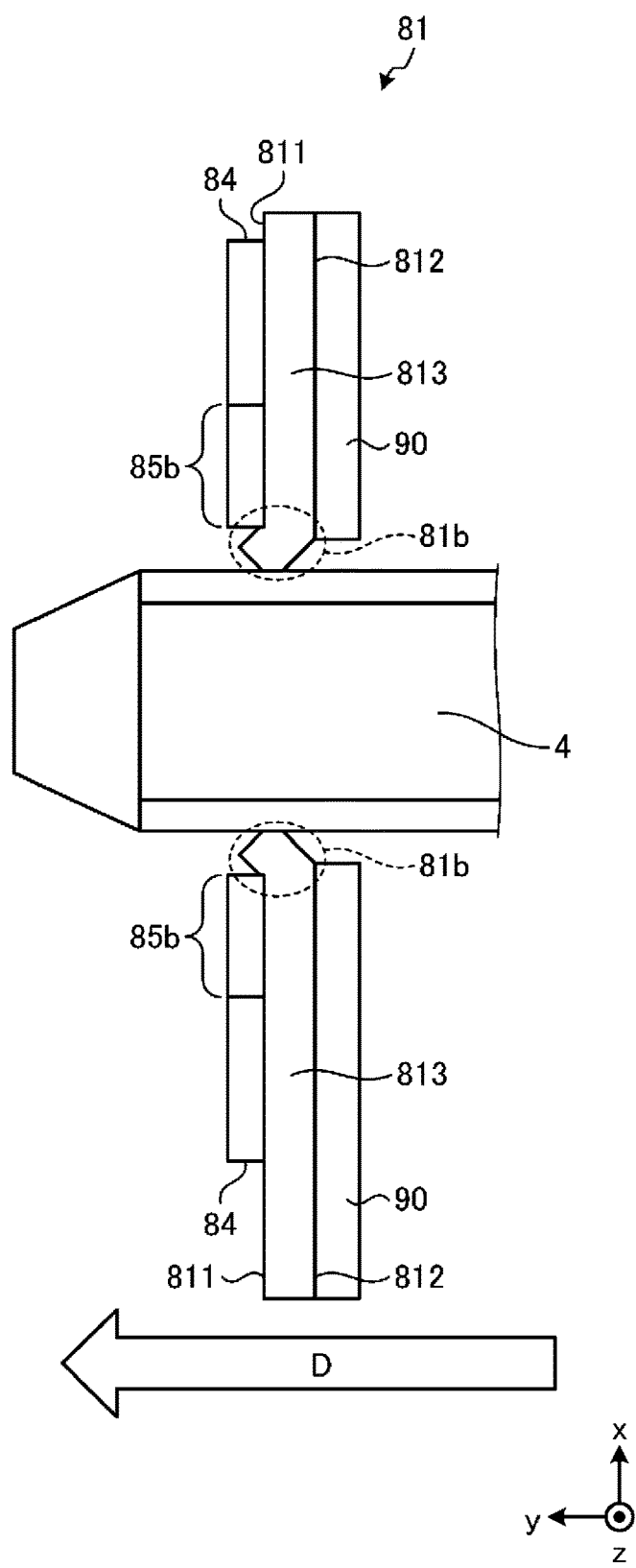
FIG. 10B is a cross-sectional view taken along a line B-B in FIG. 9.
Figure 10C:
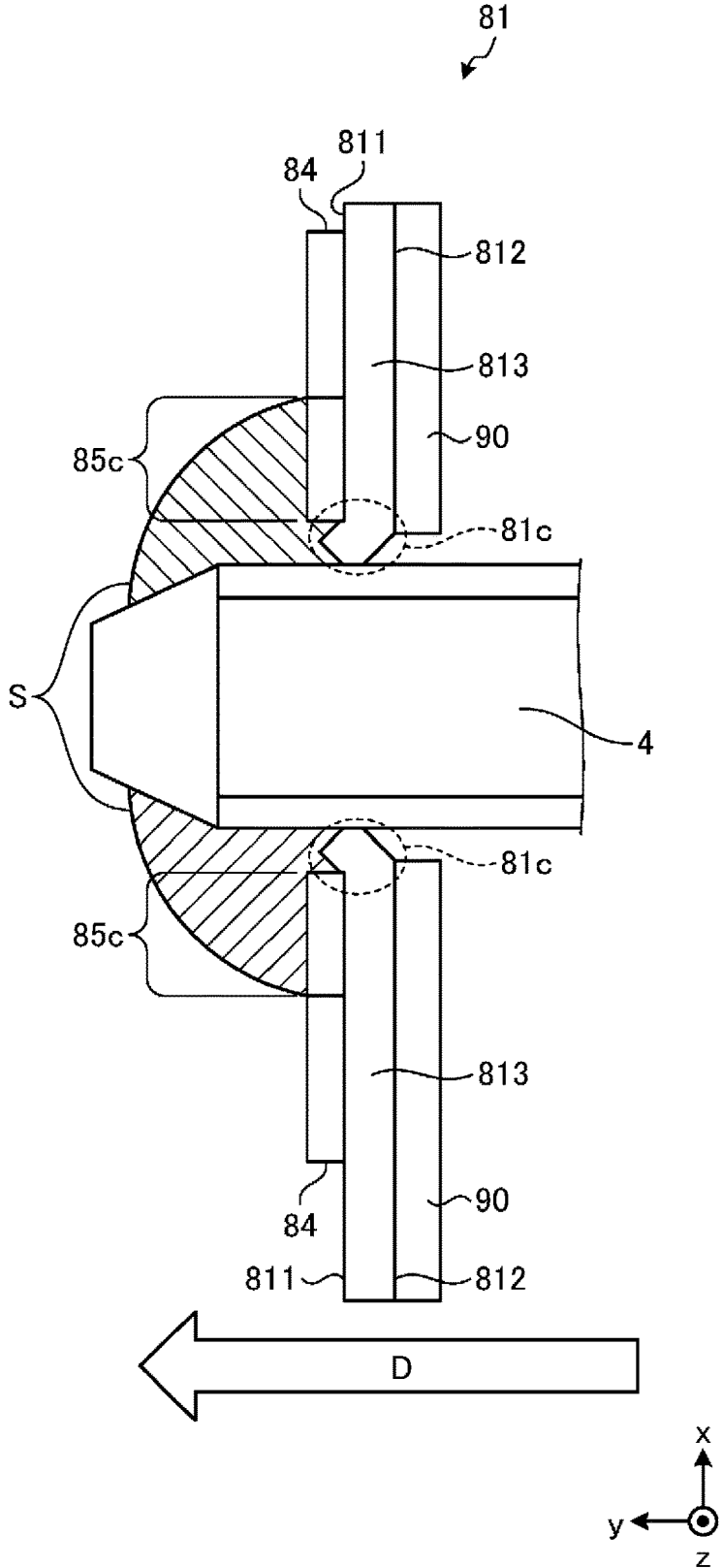
FIG. 10C is a cross-sectional view taken along a line C-C in FIG. 9.

Next, the connection between the wiring board 8 and the connection terminals 4 will be described. FIG. 9 is a plan view of a first planar part of the wiring board according to the first embodiment. FIG. 10A is a cross-sectional view taken along a line A-A in FIG. 9, FIG. 10B is a cross-sectional view taken along a line B-B in FIG. 9, and FIG. 10C is a cross-sectional view taken along a line C-C in FIG. 9. In FIG. 9, at a top, a diagram of a state before the connection terminal 4 is mounted is illustrated, at a middle, a diagram of a state after the connection terminal 4 is mounted and before the connection terminal 4 is soldered is illustrated, and at a bottom, a diagram of a state after the connection terminal 4 is soldered is illustrated. That is, FIG.

10A illustrates the diagram of the state before the connection terminal 4 is mounted, FIG. 10B illustrates the diagram of the state after the connection terminal 4 is mounted and before the connection terminal 4 is soldered, and FIG. 10C illustrates the diagram of the state after the connection terminal 4 is soldered.

As illustrated in FIGS. 9 and 10A, the first planar part 81 includes, for example, inner circumferential end parts 81a to 81c, and inner circumferential end parts 81d and 81e (not illustrated). The inner circumferential end part 81a is formed at the inner side than the first land 85a formed at the part surrounding the hole part H1 of the wiring line 84. Similarly, the inner circumferential end parts 81b to 81e are formed at the inner side than the first lands 85b to 85e formed at the parts surrounding the hole parts H1 of the wiring lines 84, respectively. That is, the inner circumferential end parts 81a to 81e are formed at positions where the hole parts H1 are formed.

As described above, the inner circumferential end parts 81a to 81e being the parts of the first planar part 81 of the wiring board 8 are formed of a bendable material. The hole parts H1 formed by the inner circumferential end parts 81a to 81e are smaller than the size of the connection terminal 4. Thus, when the connection terminals 4 are inserted into the hole parts H1, the inner circumferential end parts 81a to 81e deform in a direction where the connection terminals 4 pass through the hole parts H1.

As illustrated in FIG. 10B, when the connection terminal 4 is inserted into the hole part H1, the inner circumferential end part 81b deforms in a direction D (Y-axis positive direction) where the connection terminal 4 passes through the hole part H1. The deformed inner circumferential end part 81b is in contact with an outer peripheral surface of the one end part 49 of the connection terminal 4.

Next, when the connection terminal 4 is soldered to the first planar part 81 of the wiring board 8, the solder S is placed at a position overlapping the first land 85c, as illustrated in FIGS. 9 and 10C. In this case, the inner circumferential end part 81c deformed in the direction D (Y-axis positive direction) where the connection terminal 4 passes through the hole part H1 suppresses the outflow of the solder S in a direction opposite to the direction D (Y-axis negative direction). This makes it possible for the wiring board 8 in the present embodiment to suppress solder leakage from the hole part H1.

For example, a configuration is known to electrically connect connection terminals connecting the sensor and electronic components to external devices to a printed circuit board (PCB) or the like having a multi-layer power distribution configuration. In this case, for example, columnar connection terminals are fixed to the housing of the rotating device or the like.

However, when fixing the columnar connection terminals to the housing or the like, misalignment is likely to occur. The misalignment when fixing the connection terminals to the housing can cause the connection terminals to rattle.

Figure 11:
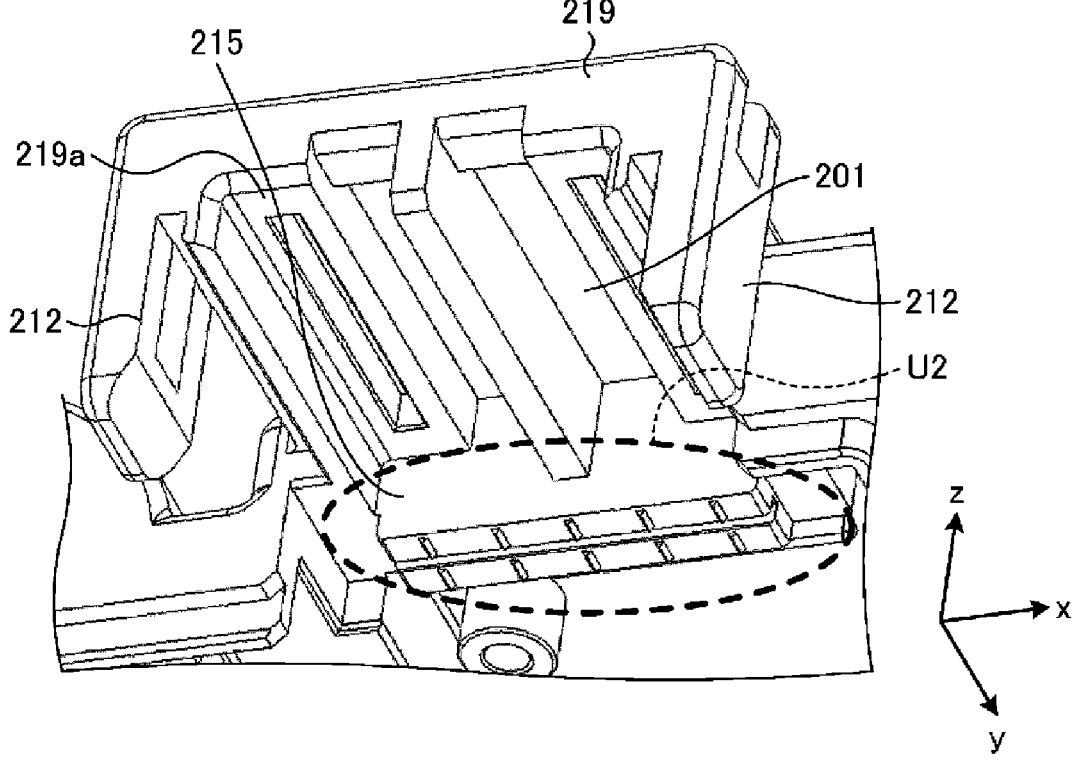
FIG. 11 is a perspective view of a projected part of the first housing according to the first embodiment.
Figure 12:
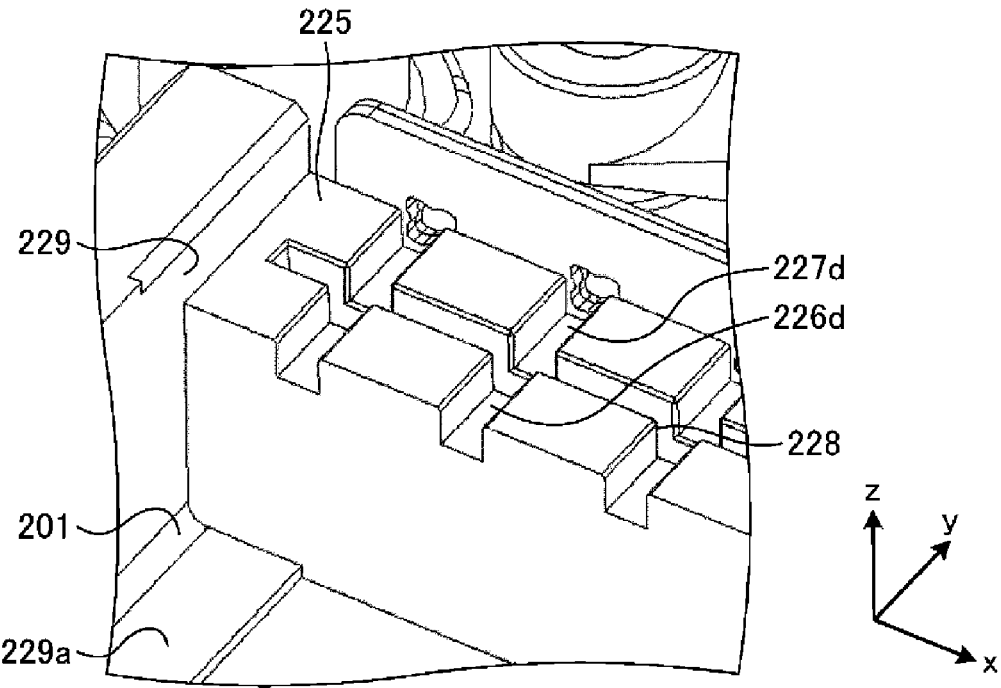
FIG. 12 is a perspective view of a holding part of a second housing according to the first embodiment.

Thus, in the present embodiment, the connection terminals 4 are held by the holding part 225 of the second housing 22 and the pressing part 215 of the first housing 21. The pressing part 215 forms part of an inner wall part of the housing 21. When a connector (terminals to be connected) of the external device (not illustrated) is inserted into the connector part 200, the pressing part 215, as the inner wall part, suppresses further insertion of the connector into the housing 2. That is, the pressing part 215 is a part of the connector part 200 forming a closed space other than an insertion port 201 (opening) where the connector of the external device is inserted. FIG. 11 is a perspective view of a projected part of the first housing according to the first embodiment. FIG. 12 is a perspective view of a holding part of the second housing according to the first embodiment, and FIG. 13 is a perspective view of the pressing part of the first housing according to the first embodiment.

Figure 13:
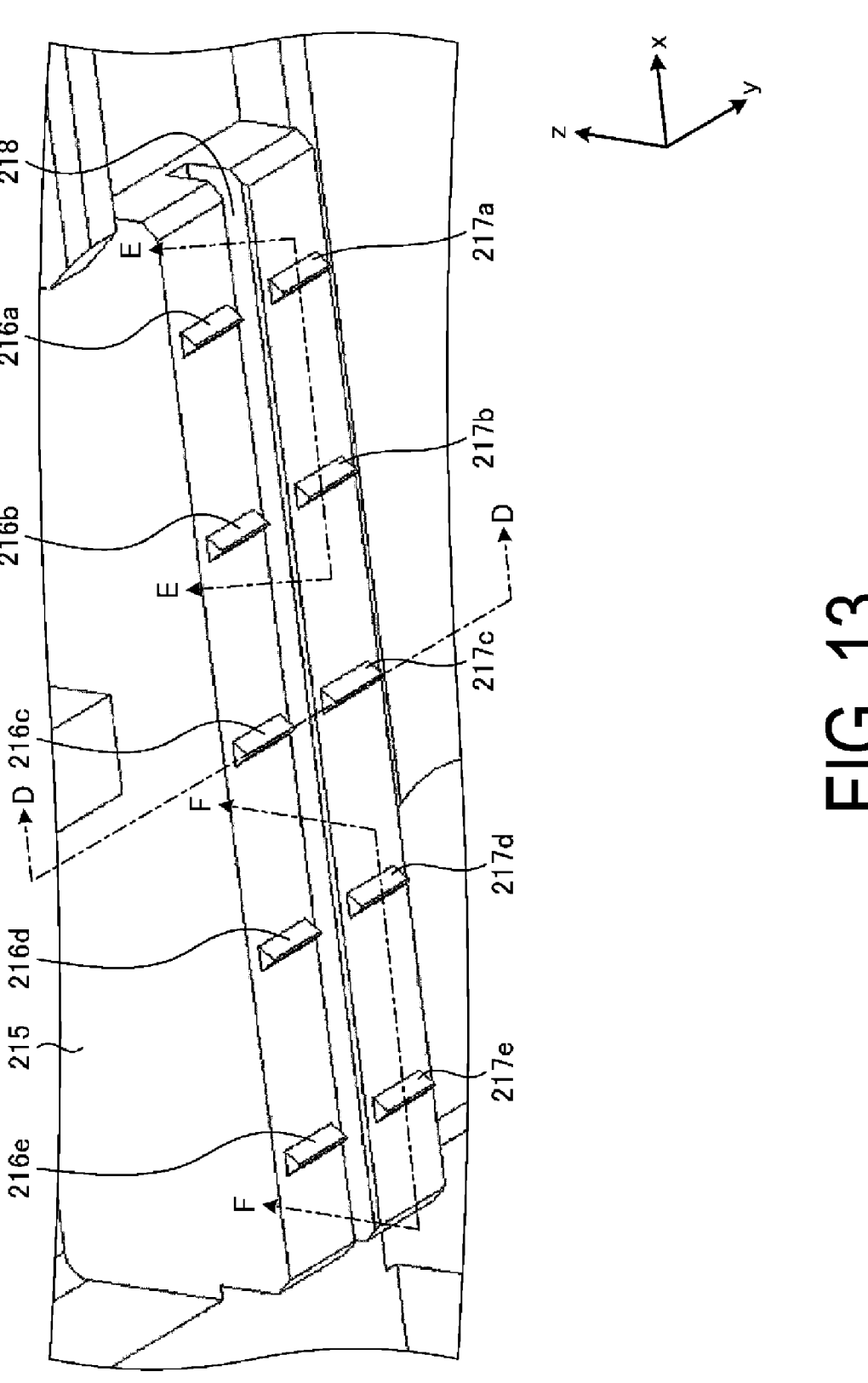
FIG. 13 is a perspective view of a pressing part of the first housing according to the first embodiment.

As illustrated in FIGS. 11 and 13, in the present embodiment, the pressing part 215 including the first projection parts 216a to 216e and the second projection parts 217a to 217e is formed at the inside of the projected part 219 of the first housing 21. As illustrated in FIGS. 6 and 12, the holding part 225 including a groove part 228, first holding grooves 226a to 226e, and second holding grooves 227a to 227e is formed at the inside of the projected part 229 of the second housing 22. Note that FIG. 12 illustrates an enlarged view of a portion corresponding to a reference sign U1 in FIG. 6, and FIG. 13 illustrates an enlarged view of a portion corresponding to a reference sign U2 in FIG. 11. In the following, when the first projection parts 216a to 216e are represented without distinction, the first projection parts 216a to 216e are referred to as first projection parts 216, and when the second projection parts 217a to 217e are represented without distinction, the second projection parts 217a to 217e are referred to as second projection parts 217. Further, in the following, when the first holding grooves 226a to 226e are represented without distinction, the first holding grooves 226a to 226e are referred to as first holding grooves 226, and when the second holding grooves 227a to 227e are represented without distinction, the second holding grooves 227a to 227e are referred to as second holding grooves 227. Note that the first projection parts 216 and the second projection parts 217 are examples of a protruding part, and the first holding grooves 226 and the second holding grooves 227 are examples of a recessed part.

The first projection parts 216 and the second projection parts 217 are formed of, for example, the same resin material as the housing 2. In this case, the pressing part 215 including the first projection parts 216, the second projection parts 217, and a groove part 218 is integrally molded with the first housing 21 by, for example, injection molding of a resin using a mold. Similarly, the holding part 225 including the groove part 228, the first holding grooves 226, and the second holding grooves 227 is integrally molded with the second housing 22 by, for example, injection molding of a resin using a mold.

As described above, the flanges 41 of the connection terminals 4 are fitted into the groove part 228 of the second housing 22. Parts of the connection terminal 4 other than the flanges 41 are held by the first holding groove 226 and the second holding groove 227. The first holding grooves 226 and the second holding grooves 227 are formed side by side in a direction, and in this direction, the connection terminals 4 are inserted (Y-axis positive direction). In the present embodiment, the first holding grooves 226 are formed at the Y-axis negative direction side in relation to the groove part 228 at the holding part 225, and the second holding grooves 227 are formed at the Y-axis positive direction side in relation to the groove part 228 at the holding part 225. That is, the first holding grooves 226 and the second holding grooves 227 are formed at positions where the groove part 228 is sandwiched at the Y-axis positive direction side.

At the pressing part 215 of the first housing 21, the groove part 218 is formed at a position corresponding to the groove part 228 of the second housing 22. The flanges 41 of the connection terminals 4 are also fitted into the groove part 218. The pressing part 215 is formed with the first projection parts 216 and the second projection parts 217 at positions corresponding to the first holding grooves 226 and the second holding grooves 227 of the second housing 22. The first projection parts 216 and the second projection parts 217 press the connection terminals 4 held by the holding part 225 of the second housing 22 from an upward direction (Z-axis positive direction). In other words, the connection terminals 4 are sandwiched between the first projection parts 216 and the first holding grooves 226 and are sandwiched between the second projection parts 217 and the second holding grooves 227.

Figure 14:
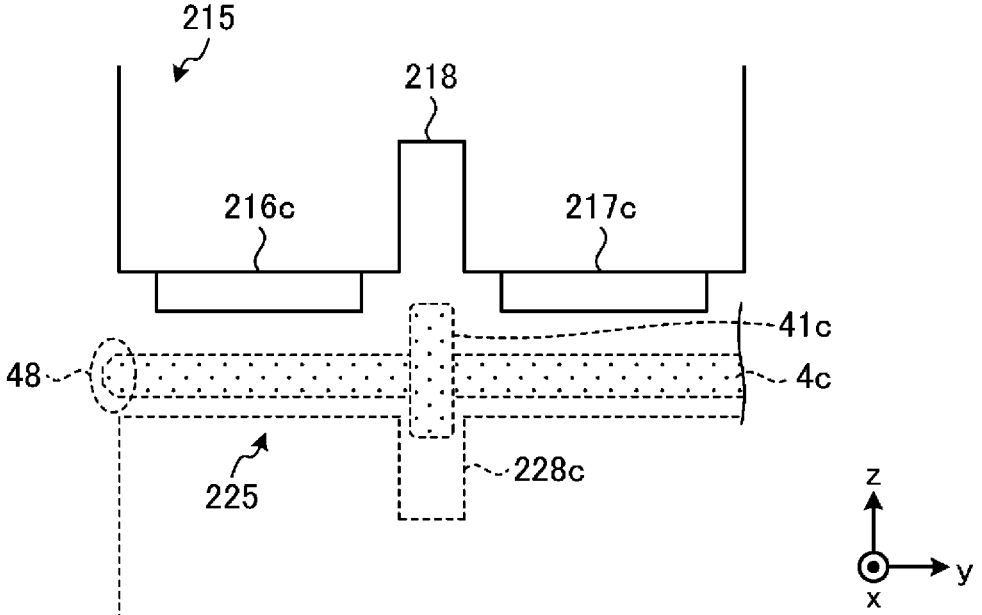
FIG. 14 is a cross-sectional view taken along a line D-D in FIG. 13.
Figure 15A:
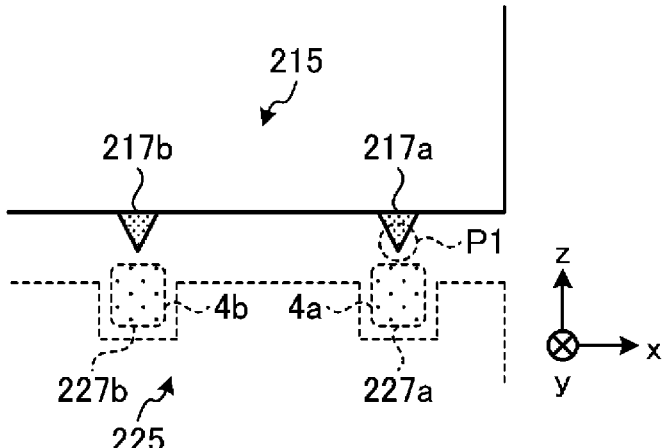
FIG. 15A is a cross-sectional view taken along a line E-E in FIG. 13.
Figure 15B:
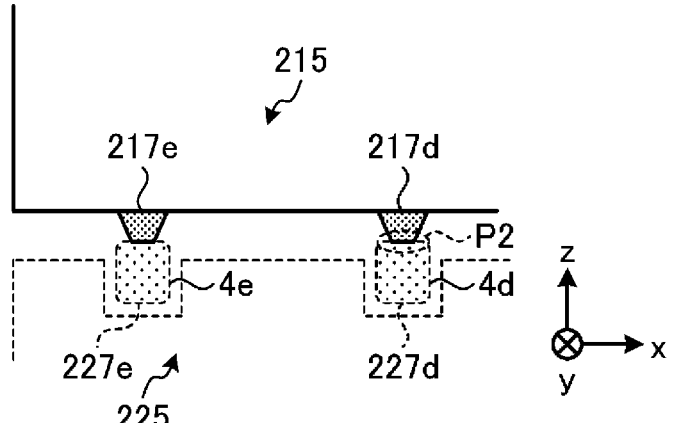
FIG. 15B is a cross-sectional view taken along a line F-F in FIG. 13.

FIG. 14 is a cross-sectional view taken along a line D-D in FIG. 13, FIG. 15A is a cross-sectional view taken along a line E-E in FIG. 13, and FIG. 15B is a cross-sectional view taken along a line F-F in FIG. 13. As illustrated in FIG. 14, a pair of the first projection part 216 and the second projection part 217 are formed side by side at positions sandwiching the groove part 218 in the insertion direction (Y-axis positive direction) of the connection terminal 4. In other words, the pair of the first projection part 216 and the second projection part 217 presses the connection terminal 4 downward (in the Z-axis negative direction) from both sides at positions sandwiching the flange 41 of the connection terminal 4. This makes it possible to suppress rattling in the insertion direction (Y-axis positive direction) of the connection terminal 4. Further, a height of an end part 48 of the connection terminal 4 (an end part at the opening 201 side or the external device side of the connector part 200) can be set to a predetermined height. Here, the predetermined height refers to, for example, a distance in the Z-axis direction to the end parts 48 of the connection terminal 4 from each of one part 219a of the first housing and one part 229a of the second housing, forming the connector part 200 and opposing each other. This makes it possible to insert the connection terminals 4 into a connector of an external device having any height and shape. Note that the insertion direction of the connection terminals 4 is a direction where the connection terminals 4 are inserted into the connector of the external device. In addition, the insertion direction of the connection terminals 4 is a longitudinal direction of the connection terminals 4.

As illustrated in FIG. 15A, the first projection parts 216 and the second projection parts 217 are formed in polygonal shapes having top parts P1, such as triangles. When the first housing 21 is coupled to the second housing 22, the first projection parts 216 and the second projection parts 217 press the connection terminals 4 held at the first holding grooves 226 and the second holding grooves 227 of the second housing 22 from the upward direction (Z-axis positive direction). At that time, the top parts P1 of the first projection parts 216 and the second projection parts 217 are deformed as illustrated in FIG. 15B.

As illustrated in FIG. 15B, the top parts P2 of the second projection parts 217d and 217e are pressed against the connection terminals 4 and deformed. The second projection parts 217a to 217c (not illustrated) and the first projection parts 216 (not illustrated) are also deformed. This allows the connection terminals 4 to be securely fixed to the housing 2 because the connection terminals 4 are sandwiched between the first projection parts 216 and the first holding grooves 226 and between the second projection parts 217 and the second holding grooves 227.

As described above, in the present embodiment, the wiring board 8 includes the base 813 including the hole part H1 and the inner circumferential end part 81a forming the hole part H1, and the wiring line 84 including the part 85 surrounding the hole part H1. The inner circumferential end part 81a of the base 813 is disposed at the inner side than the part 85 surrounding the hole part H1. The inner circumferential end part 81a of the base 813 is deformed in the direction passing through the hole part H1. This makes it possible to suppress solder leakage from the hole part H1.

In the present embodiment, the rotating device 1 includes the motor 3, the plurality of gears 6, the plurality of connection terminals 4 for electrically connecting to the outside, and the housing 2 accommodating the motor 3, the gears 6, and the connection terminals 4. The housing 2 is formed with the first housing 21 and the second housing 22. The second housing 22 includes the recessed parts 226 and 227, and the connection terminals 4 are engaged into the recessed parts 226 and 227. The first housing 21 is provided with the protruding parts 216 and 217 protruding toward the connection terminals 4 and the recessed parts 226 and 227. The connection terminal 4 are pressed toward the recessed parts 226 and 227 by the protruding parts 216 and 217. With this configuration, rattling of the connection terminals 4 is suppressed, and the connection terminals 4 can be securely fixed to the housing 2.

Second Embodiment

Next, a wiring board 80 according to a second embodiment will be described with reference to the drawings. Note that the wiring board 80 according to the second embodiment and the wiring board 8 according to the first embodiment described above have the same basic structure, and the same components are denoted by the same reference signs and specific descriptions will be omitted.

Figure 16:
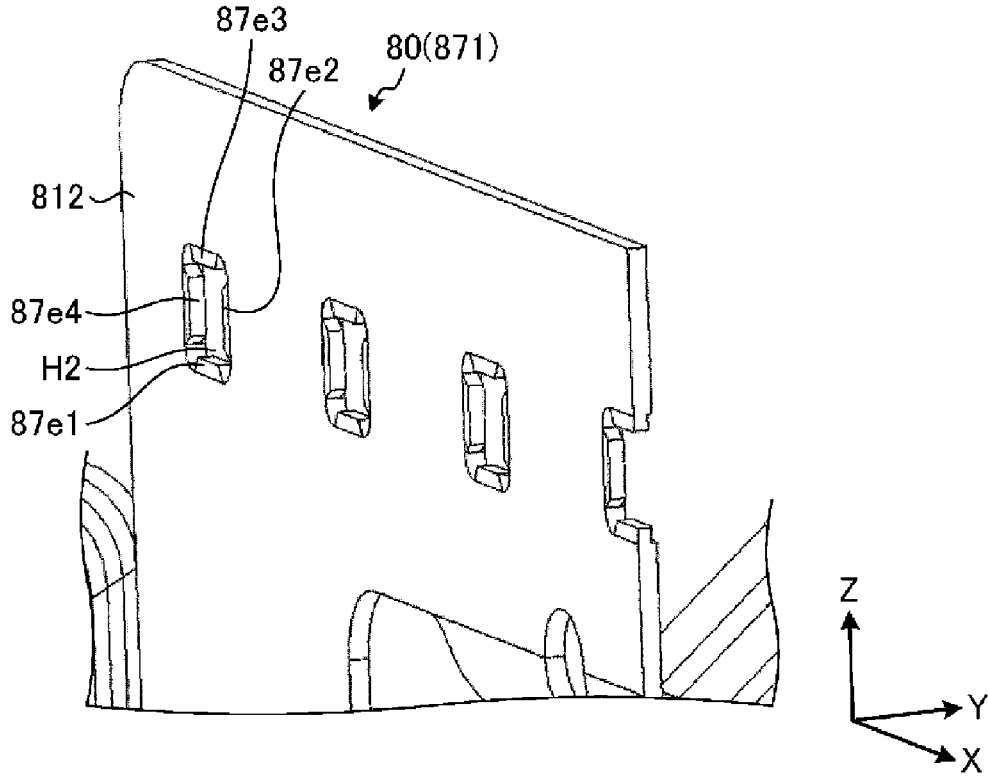
FIG. 16 is a perspective view of a wiring board according to a second embodiment.
Figure 17:
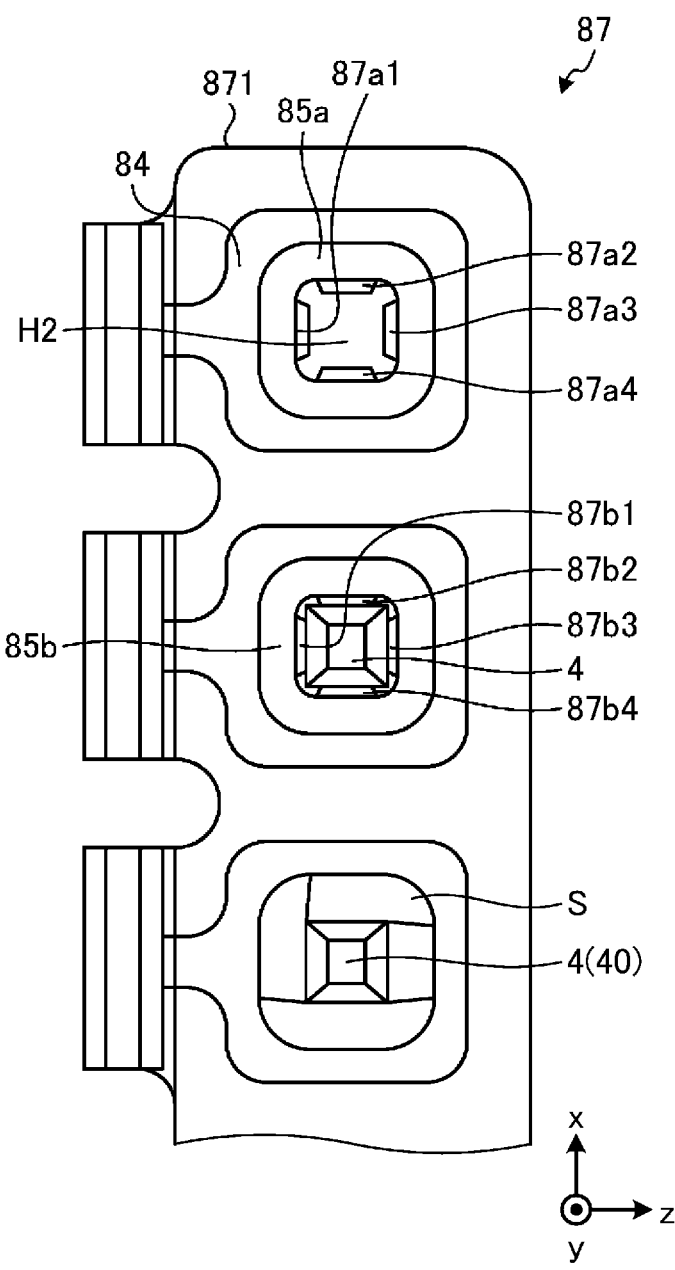
FIG. 17 is a plan view of a first planar part of the wiring board according to the second embodiment.
Figure 18:
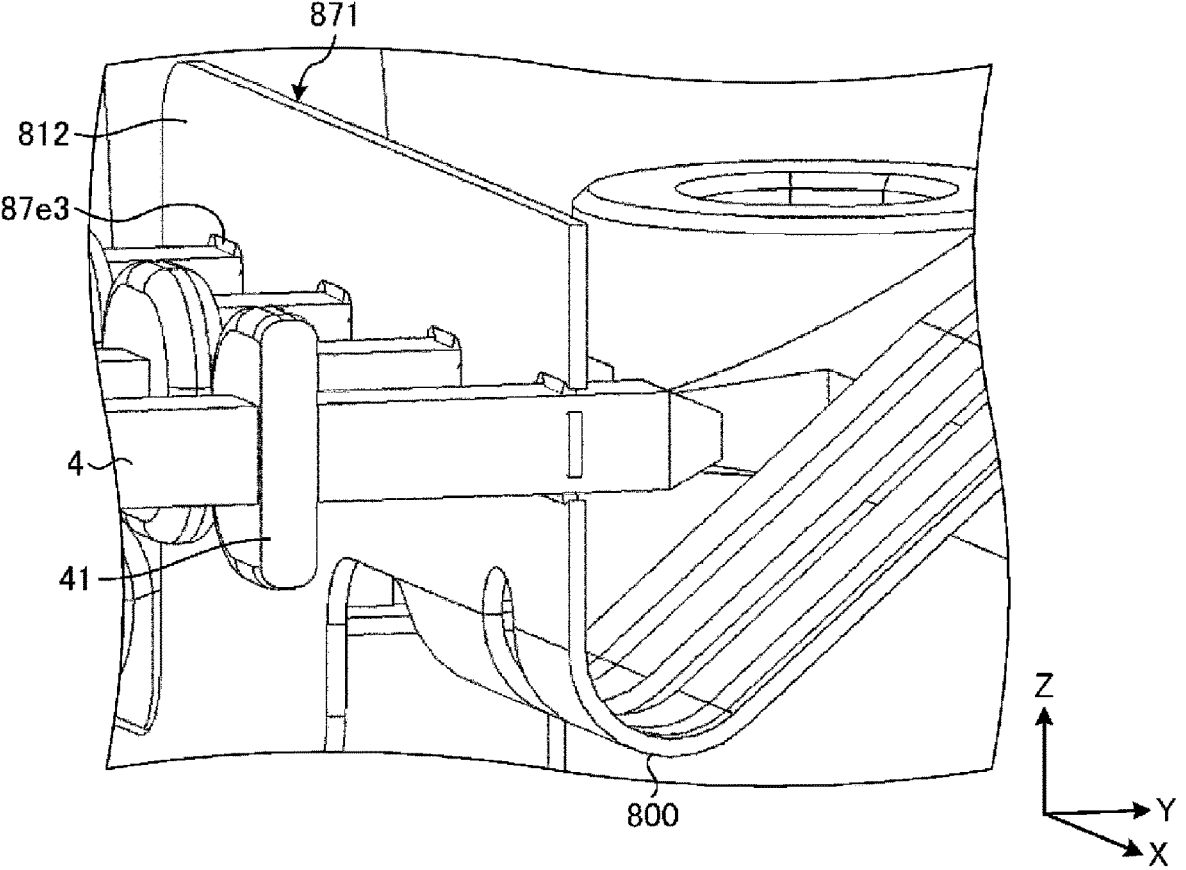
FIG. 18 is a perspective view of the wiring board with connection terminals inserted according to the second embodiment.

FIG. 16 is a perspective view of a wiring board according to the second embodiment, FIG. 17 is a plan view of a first planar part of the wiring board according to the second embodiment, and FIG. 18 is a perspective view of the wiring board with connection terminals inserted according to the second embodiment. Note that in FIGS. 16 and 18, the reinforcing member 90 and the second housing 22 are not illustrated. FIG. 18 illustrates a diagram of a state before the connection terminals 4 are soldered to the wiring board 80.

As illustrated in FIG. 16, the wiring board 80 according to the second embodiment differs from the wiring board 8 according to the first embodiment. The inner circumferential end part 87e forming a hole part H2 is provided with a plurality of projected parts 87e1 to 87e4 in a base 871 of a first planar part 87. In the following, when the plurality of inner circumferential end parts 87a to 87e are represented without distinction, the inner circumferential end parts 87a to 87e may be referred to as inner circumferential end parts 87.

As illustrated in FIG. 17, in the second embodiment, a plurality of projected parts 87a1 to 87a4 project from four direction of the hole part H2. In addition, the plurality of projected parts 87a1 to 87a4 are formed at the inner side than the first land 85a formed at a part surrounding the hole part H2 of the wiring line 84. Also, in the second embodiment, the hole part H2 formed by the inner circumferential end part 87a formed by the plurality of projected parts 87a1 to 87a4 is smaller than the size of the connection terminal 4. With this configuration, when the connection terminal 4 is inserted into the hole part H2, the plurality of projected parts 87a1 to 87a4 forming the inner circumferential end part 87a are each deformed in a direction where the connection terminal 4 passes through the hole part H2. In the case illustrated in FIG. 17, when the connection terminal 4c is soldered to the first land 85c, the outflow of the solder S is suppressed by the plurality of deformed projected parts 87a1 to 87a4.

As illustrated in FIG. 17, when the connection terminal 4 is inserted into the hole part H2, a plurality of projected parts 87b1 to 87b4 forming the inner circumferential end part 87b each individually deform in the direction where the connection terminal 4 passes through the hole part H1 and are in contact with the outer peripheral surface of the connection terminal 4. When the plurality of projected parts 87b1 to 87b4 are individually deformed, wrinkles are less likely to occur at the base 871, for example, at the vicinity of an apex of the hole part H2, compared with the case where the inner circumferential end part 81b according to the first embodiment is deformed. This makes it possible to suppress solder leakage more effectively from the hole part H2 in the second embodiment, because the inner circumferential end part 87b of the base 871 is in contact with the connection terminal 4 without a gap. When the plurality of projected parts 87b1 to 87b4 are individually deformed, the inner circumferential end part 87b of the base 871 is easily deformed following the movement of the connection terminal 4, thus improving workability when mounting the connection terminal 4.

As described above, in the second embodiment, the inner circumferential end part 87a of the base 871 includes the plurality of projected parts 87a1 to 87a4 projecting inward of the hole part H2. The plurality of projected parts 87a1 to 87a4 are lined in the circumferential direction of the hole part H2. This makes it possible to suppress solder leakage more effectively from the hole part H2.

The present invention has been described above based on the embodiments, but the present invention is not limited to the embodiments, and it goes without saying that various modifications are possible without departing from the gist of the present invention. Various modifications within a scope not departing from the gist are included in the technical scope of the present invention, and this is obvious to a person having skill in the art from the description of the claims.

For example, although the rotating device 1 including five connection terminals 4 is described, the number of connection terminals 4 is not limited to five. Although the case is described where the hole parts H1 and H2 are quadrangular, the shape is not limited to being quadrangular, and the shape of the hole part may be freely changed according to, for example, the shape of the connection terminal. For example, when the cross-sectional shape of the connection terminal is triangular, the hole part may also be triangular. In this case, in the second embodiment, the inner circumferential end part 87a may be formed by, for example, three projected parts 87a1 to 87a3.

Figure 19:
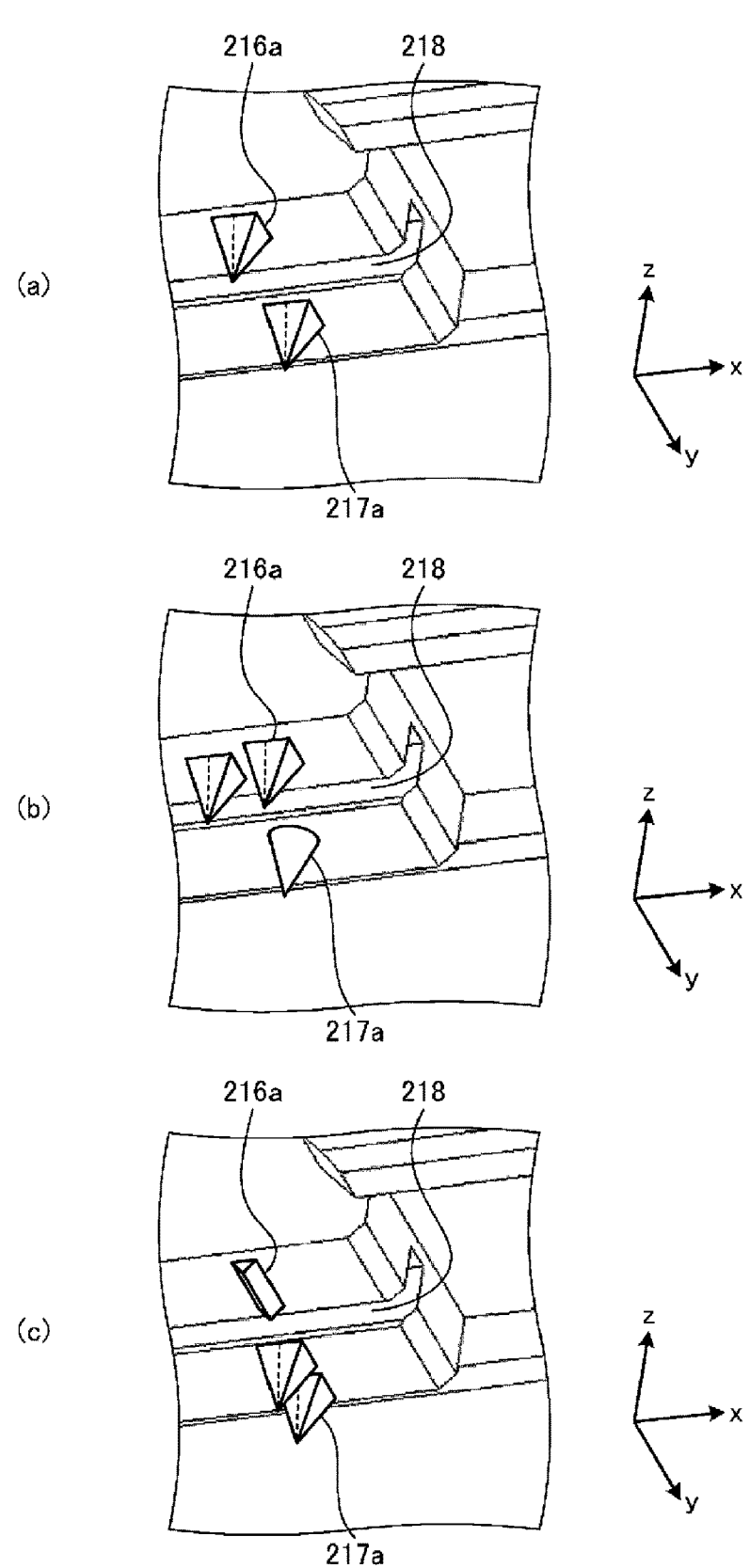
FIG. 19 is a perspective view of a pressing part of a first housing according to a modified example.

The first projection part 216 and the second projection part 217 pressing the connection terminal 4 have been described as a triangular prism shape, but the first projection part 216 and the second projection part 217 may have another shape such as a pentagonal prism, as long as the top parts are pressed and deformed. The first projection part 216 and the second projection part 217 may be a three-dimensional shape of a pyramid, such as a triangular pyramid, quadrangular pyramid, or circular cone. FIG. 19 is a perspective view of a pressing part of a first housing according to a modified example. As illustrated in FIGS. 19 (*b*) and (*c*), the first projection part 216 and the second projection part 217 being the three-dimensional shape of a pyramid, may be formed at a plurality of locations in the insertion direction of the connection terminal 4 and the direction intersecting the connection terminal 4 (orthogonal direction in the embodiment). As illustrated in FIGS. 19 (*b*) and (*c*), one of the first projection part 216 and the second projection part 217 may be a prism such as a triangular prism or a pyramid such as a triangular pyramid or a quadrangular pyramid, and the other may have a three-dimensional shape different from the three-dimensional shape of the one. The shapes of the first projection part 216 and the second projection part 217 before deformation, the first projection part 216 and the second projection part 217 after deformation, or the first projection part 216 and the second projection part 217 without deformation, may be different from each other. The configuration of the first projection part 216 and the second projection part 217 is described. In the configuration, the first projection part 216 and the second projection part 217 extend in the insertion direction of the connection terminal 4 (Y-axis positive direction). However, the configuration is not limited to this configuration and, for example, the first projection part 216 and the second projection part 217 may extend in another direction, such as a direction orthogonal to the insertion direction of the connection terminal 4 (X-axis direction).

The first projection part 216 and the second projection part 217, pressing the connection terminal 4, have been described as being integrally molded with the first housing 21 by the injection molding of the resin using the mold. However, not limited to the injection molding, the first projection part 216 and the second projection part 217 formed as separate parts may be joined to the first housing 21. The first projection part 216 and the second projection part 217 may be formed of a material other than the resin, as long as the material is softer than the material of the connection terminal 4. The material of the first projection part 216 and the second projection part 217 is, for example, plastically deformable, but the material is not limited to this, and may be elastic.

REFERENCE SIGNS LIST

1 Rotating device, 2 Housing, 3 Motor, 4 Connection terminal, 5 Output gear, 6 Transmission gear, 7 Sensor, 8, 80 Wiring board, 90 Reinforcing member, 21 First housing, 22 Second housing, 28 Projected part, 200 Connector part, 210 First surface part, 211 First side wall part, 212 Engagement part, 215 Pressing part, 216 First projection part, 217 Second projection part, 219 Projected part, 220 Second surface part, 221 Second side wall part, 222 Engagement projection, 225 Holding part, 226 First holding groove, 227 Second holding groove, 228 Groove part, 229 Projected part, 281 First through-hole, 282 Second through-hole, 31 Rotation shaft, 32 Worm gear, 33 Terminal, 41 Flange, 51 Output shaft, 61 First transmission gear, 62 Second transmission gear, 611 Helical gear, 612 Small diameter gear, 621 Helical gear, 81 First planar part, 82 Second planar part, 83 Third planar part, 84 Wiring line, 85 First land, 86 Second land, 81a to 81e, 87a to 87e Inner circumferential end part, 800 Bent part, 813, 871 Base, 819 Another end part, 93 Attachment tab, 94 Coupling hole, 100 Air conditioning system, H1, H2 Hole part, S Solder

The invention claimed is:

1. A wiring board comprising:

a base including a hole part and an inner circumferential end part forming the hole part; and a wiring line including a part surrounding the hole part, wherein the base has a first surface, and a second surface at an opposite side of the first surface in a direction passing through the hole part, wherein:

the base is a film formed of resin material, the wiring line is formed at the first surface of the base, a part of the wiring line surrounding the hole part includes a land, the inner circumferential end part of the base is disposed at an inner side than the part of the wiring line surrounding the hole part, the inner circumferential end part of the base is deformed in the direction passing through the hole part, and a conductive member is provided at the first surface side of the inner circumferential end part of the base and is configured to electrically connect a columnar conductive member, which is disposed inside of the hole part, and the wiring line.

2. The wiring board according to claim 1, wherein the inner circumferential end part of the base includes a plurality of projected parts projecting inward of the hole part, and the plurality of projected parts are lined in a circumferential direction of the hole part.

3. The rotating device according to claim 2, wherein the plurality of projected parts are configured to suppress leakage of the conductive member from the hole part.

4. The wiring board according to claim 1, wherein in the direction passing through the hole part, the deformed inner circumferential end part of the base is in contact with an outer circumferential side surface of the columnar conductive member.

5. The wiring board according to claim 4, wherein a size of the columnar conductive member is larger than the hole part formed by the inner circumferential end part and smaller than the part surrounding the hole part of the wiring line.

6. A rotating machine comprising:

a wiring board;

a columnar conductive member; and a housing, wherein the wiring board comprises:

a base including a hole part and an inner circumferential end part forming the hole part, a wiring line including a part surrounding the hole part, wherein the base has a first surface, and a second surface at an opposite side of the first surface in a direction passing through the hole part, wherein:

the base is a film formed of resin material, the wiring line is formed at the first surface of the base, a part of the wiring line surrounding the hole part includes a land, the inner circumferential end part of the base is disposed at an inner side than the part of the wiring line surrounding the hole part, the inner circumferential end part of the base is deformed in the direction passing through the hole part, and a conductive member is provided at the first surface side of the inner circumferential end part of the base and is configured to electrically connect the columnar conductive member, which is disposed inside of the hole part, and the wiring line, and the columnar conductive member is fixed at the housing.

7. The rotating machine according to claim 6, wherein the second surface opposes the part of the housing via a member different from the wiring board.

* * * * *